(12) United States Patent
Hwang et al.

(10) Patent No.: US 11,961,222 B2
(45) Date of Patent: Apr. 16, 2024

(54) MASK INSPECTION APPARATUS AND MASK INSPECTION METHOD USING THE SAME

(71) Applicants: Samsung Display Co., LTD., Yongin-si (KR); HIMS CO., LTD., Incheon (KR)

(72) Inventors: Sangdon Hwang, Cheonan-si (KR); BongSuk Kim, Cheonan-si (KR); TaeHyun Kim, Incheon (KR); Mihye Kwon, Asan-si (KR); Ilha Song, Osan-si (KR); Jimin Woo, Gyeongsan-si (KR)

(73) Assignees: Samsung Display Co., Ltd., Yongin-si (KR); HIMS CO., LTD., Incheon (KR)

( * ) Notice: Subject to any disclaimer, the term of this patent is extended or adjusted under 35 U.S.C. 154(b) by 297 days.

(21) Appl. No.: 17/235,200

(22) Filed: Apr. 20, 2021

(65) Prior Publication Data
US 2021/0350514 A1 Nov. 11, 2021

(30) Foreign Application Priority Data

May 11, 2020 (KR) .................. 10-2020-0056141

(51) Int. Cl.
*G06T 7/00* (2017.01)
*G01N 21/956* (2006.01)

(52) U.S. Cl.
CPC ........... *G06T 7/001* (2013.01); *G01N 21/956* (2013.01); *G06T 2207/30108* (2013.01)

(58) Field of Classification Search
CPC .......... G06T 7/001; G06T 2207/30108; G06T 2207/20021; G06T 2207/30136; G06T 7/0008; G01N 21/956; G01N 21/95607; G01N 2021/95676; G03F 1/84; C23C 14/042; H10K 71/166; H10K 71/00
See application file for complete search history.

(56) References Cited

U.S. PATENT DOCUMENTS

| | | | | |
|---|---|---|---|---|
| 4,870,693 A | * | 9/1989 | Arai | ........................ G06T 7/001 |
| | | | | 382/144 |
| 9,235,886 B2 | * | 1/2016 | Kim | ................... G01N 21/9501 |
| 2006/0133660 A1 | * | 6/2006 | Ogi | ........................ G06T 7/001 |
| | | | | 382/149 |
| 2008/0204723 A1 | * | 8/2008 | Sekine | ..................... G03F 1/84 |
| | | | | 356/73 |
| 2017/0206433 A1 | * | 7/2017 | Ogawa | .................... G03F 7/702 |

FOREIGN PATENT DOCUMENTS

| | | |
|---|---|---|
| CN | 109207920 | 1/2019 |
| KR | 10-1053779 | 8/2011 |
| KR | 10-2014-0112605 | 9/2014 |
| KR | 10-2019-0095456 | 8/2019 |
| KR | 10-2015844 | 8/2019 |

\* cited by examiner

*Primary Examiner* — Roy M Punnoose
(74) *Attorney, Agent, or Firm* — H.C. Park & Associates, PLC

(57) ABSTRACT

A mask inspection method including the steps of obtaining an image of a mask including a first region having a plurality of first openings, and a second region having a plurality of second openings, sectioning the image into a first partial image corresponding to the first region and a second partial image corresponding to the second region, respectively, inspecting the first region of the mask based on the first partial image, and inspecting the second region of the mask based on the second partial image.

20 Claims, 11 Drawing Sheets

MASK INSPECTION APPARATUS AND MASK INSPECTION METHOD USING THE SAME

CROSS REFERENCE TO RELATED APPLICATION

This application claims priority from and the benefit of Korean Patent Application No. 10-2020-0056141, filed on May 11, 2020, which is hereby incorporated by reference for all purposes as if fully set forth herein.

BACKGROUND

Field

Exemplary implementations of the invention relate generally to a mask inspection apparatus and, more specifically, to a mask inspection apparatus to inspect a mask having a plurality of openings and a method for inspecting a mask using the same.

Discussion of the Background

In general, an organic light emitting display device includes an organic layer and/or an electrode formed by a vacuum deposition method. Various masks are used for deposition processes, which are performed to fabricate the organic light emitting display device. An open slit is formed in each mask, and reliability of the organic light emitting display device depends on a state of the open slit.

The above information disclosed in this Background section is only for understanding of the background of the inventive concepts, and, therefore, it may contain information that does not constitute prior art.

SUMMARY

Applicant recognized that it is necessary to develop a method of inspecting a state of the open slit in the mask used for deposition processes such as fabricating the organic light emitting display device.

Mask inspection apparatus constructed according to the principles and exemplary implementations of the invention and methods for inspecting a mask using the same are capable of easily detecting a failure in the mask and improving reliability in the mask inspection test by separately inspecting a mask with a plurality of regions having different openings. For example, the mask may include a first region having a plurality of first openings and a second region having a plurality of second openings.

Additional features of the inventive concepts will be set forth in the description which follows, and in part will be apparent from the description, or may be learned by practice of the inventive concepts.

According to one aspect of the invention, a mask inspection method may include the steps of: obtaining an image of a mask including a first region, in which a plurality of first openings are defined, and a second region having a plurality of second openings, sectioning the image into a first partial image corresponding to the first region and a second partial image corresponding to the second region, respectively, inspecting the first region of the mask based on the first partial image, and inspecting the second region of the mask based on the second partial image.

The step of inspecting the first region may include the step of comparing a plurality of first patterns in the first partial image with each other, the first patterns corresponding to the first openings, and the step of inspecting the second region may include the step of comparing a plurality of second patterns in the second partial image with each other, the second patterns corresponding to the second openings.

The step of comparing the plurality of first patterns with each other may include the step of comparing a first target pattern, which is one of the plurality of first patterns, with each of first neighboring patterns, which are others of the plurality of first patterns adjacent to the first target pattern, and the step of comparing the plurality of second patterns with each other may include the step of comparing a second target pattern, which is one of the plurality of second patterns, with each of second neighboring patterns, which are others of the plurality of second patterns adjacent to the second target pattern.

The step of comparing the first target pattern with the first neighboring patterns may be performed to compare a shape of the first target pattern with a shape of each of the first neighboring patterns and to determine that the first region is normal when the shapes are substantially the same. The step of comparing the second target pattern with the second neighboring patterns may be performed to compare a shape of the second target pattern with a shape of each of the second neighboring patterns and to determine that the second region is normal when the shapes are substantially the same.

The step of comparing the first target pattern with the first neighboring patterns may be performed to compare a size of the first target pattern with a size of each of the first neighboring patterns and to determine that the first region is normal when the sizes are substantially the same. The step of comparing the second target pattern with the second neighboring patterns may be configured to perform to compare a size of the second target pattern with a size of each of the second neighboring patterns and to determine that the second region is normal when the sizes are substantially the same.

The step of sectioning the image into the first and second partial images may include the step of setting a boundary between the first partial image and the second partial image.

The step of setting the boundary between the first partial image and the second partial image may be performed to set a region, in which a pitch between patterns in the image is changed from a first pitch between the plurality of first patterns to a second pitch between the plurality of second patterns, as the boundary, the second pitch being different from the first pitch.

Each of the plurality of first patterns may have a first shape and each of the second patterns may have a second shape substantially equal to the first shape.

Each of the plurality of first patterns may have a first size and each of the second patterns may have a second size substantially equal to the first size.

The step of setting the boundary between the first partial image and the second partial image may be performed to set a region, in which a shape of a pattern in the image is changed from a first shape of each of the plurality of first patterns to a second shape of each of the plurality of second patterns, as the boundary, the second shape being different from the first shape.

The step of setting the boundary between the first partial image and the second partial image may be performed to set a region, in which a size of a pattern in the image is changed from a first size of each of the plurality of first patterns to a second size of each of the plurality of second patterns, as the boundary, the second size being different from the first size.

The first partial image may include a plurality of first groups defined therein, each of the plurality of first groups comprising n first group patterns, which are some of the plurality of first patterns, where the number n is an integer of 2 or greater, and the second partial image may include a plurality of second groups defined therein, each of the plurality of second groups comprising m second group patterns, which are some of the plurality of second patterns, where the number m is an integer of 2 or greater. The step of inspecting the first region may include the step of comparing the plurality of first groups with each other. The step of inspecting the second region may include the step of comparing the plurality of second groups with each other.

The numbers n and m may be different from each other.

Each of the plurality of first groups may have a first size and each of the plurality of second groups may have a second size different from the first size.

The step of comparing the plurality of first groups with each other may include the step of comparing a first target group, which is one of the plurality of first groups, with each of first neighboring groups, which are some of the plurality of first groups adjacent to the first target group, and the step of comparing the plurality of second groups with each other may include the step of comparing a second target group, which is one of the plurality of second groups, with each of second neighboring groups, which are some of the plurality of second groups adjacent to the second target group.

The step of obtaining the image may include the step of obtaining an image of the entire region of the mask.

According to another aspect of the invention, a mask inspection apparatus includes: a camera to obtain an image of a mask including a first region having a plurality of first openings, and a second region having a plurality of second openings, a sectioning part to section the image into a first partial image corresponding to the first region and a second partial image corresponding to the second region, respectively, a first inspection part to inspect the first region of the mask based on the first partial image, and a second inspection part to inspect the second region of the mask based on the second partial image.

The first inspection part may be configured to compare a plurality of first patterns in the first partial image with each other, the first patterns corresponding to the first openings, and the second inspection part may be configured to compare a plurality of second patterns in the second partial image with each other, the second patterns corresponding to the second openings.

The sectioning part may be configured to set a region, in which a pitch between patterns in the image is changed from a first pitch between the plurality of first patterns to a second pitch between the plurality of second patterns, as a boundary, the second pitch being different from the first pitch.

The sectioning part may be configured to set a region, in which a shape of a pattern in the image is changed from a first shape of each of the plurality of first patterns to a second shape of each of the plurality of second patterns, as a boundary, the second shape being different from the first shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
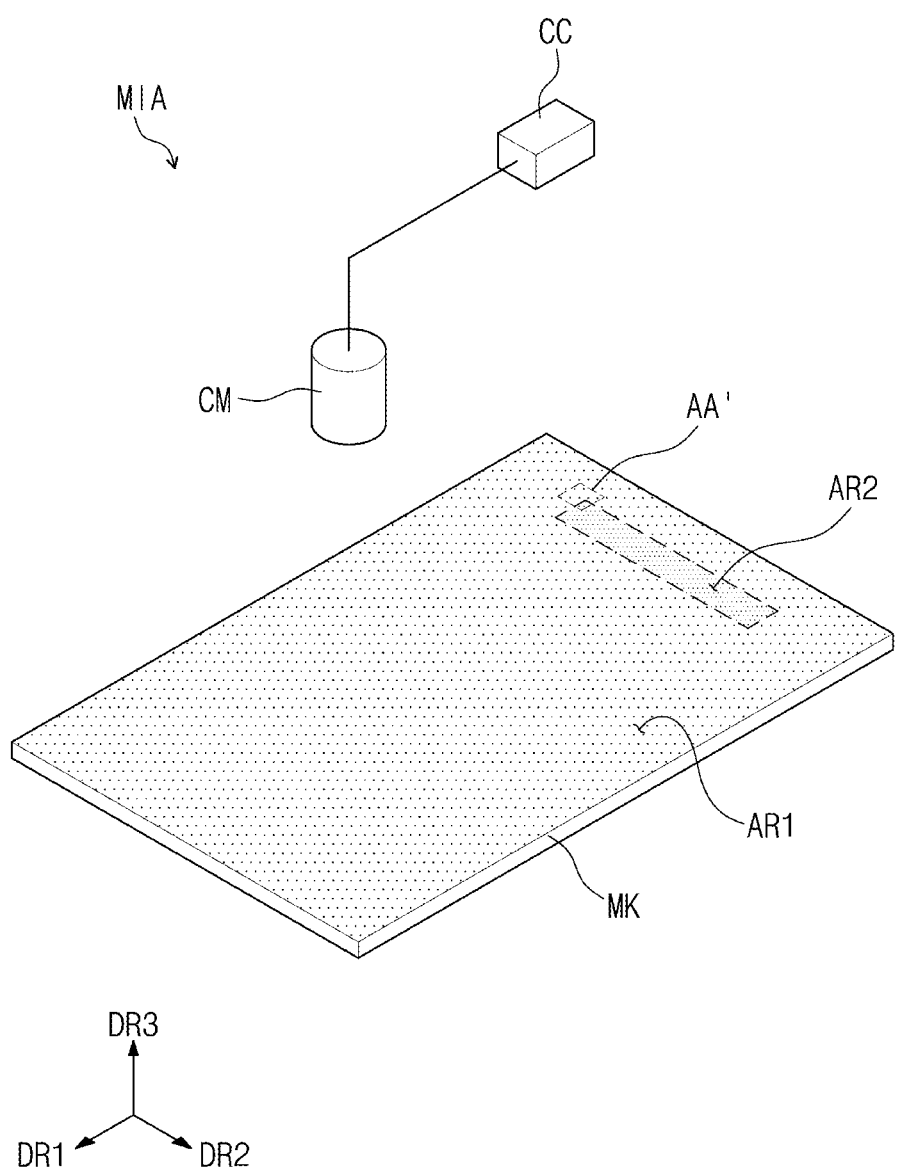
FIG. 1 is a perspective view of an embodiment of a mask inspection apparatus constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an embodiment of a mask inspection apparatus constructed according to the principles of the invention.

Referring to FIG. 1, a mask inspection apparatus MIA may be configured to inspect a mask MK. The mask MK may be fabricated using a thin plate. Stainless steel, invar, nickel, cobalt, nickel alloy, nickel cobalt alloy, or the like may be used as a material for the mask MK. However, the material for the mask MK is not limited to these examples, and various other materials may be used for the mask MK.

The mask MK may be defined to be parallel to a plane defined by a first direction DR1 and a second direction DR2. For example, the mask MK may be a rectangular shape whose sides are parallel to the first direction DR1 or the second direction DR2. However, the inventive concept is not limited to this example, and in an embodiment, the shape of the mask MK may be variously changed. A direction normal to the mask MK may correspond to a thickness direction DR3 of the mask MK (hereinafter, a third direction).

The third direction DR3 may be a direction crossing both of the first and second directions DR1 and DR2. For example, the first direction DR1, the second direction DR2, and third direction DR3 may be orthogonal to each other. In the present specification, a flat surface defined by the first and second directions DR1 and DR2 may be referred to as a "plane", and an expression of "when viewed in a plan view" may mean that an object to be described there is seen in the third direction DR3.

The mask MK may include a first region AR1 and a second region AR2. The first region AR1 may enclose the second region AR2. However, the disposition of the first and second regions AR1 and AR2 is not limited to this example. For example, the second region AR2 may enclose the first region AR1.

A plurality of first openings may be defined in the first region AR1. A plurality of second openings may be defined in the second region AR2. The first openings and the second openings may differ from each other in terms of shape, size, or arrangement.

The mask inspection apparatus MIA may include a camera CM and an inspection unit CC. The camera CM may be disposed on the mask MK. The camera CM may be used to obtain an image of the mask MK. For example, the camera CM may be used to obtain an image of the entire region of the mask MK.

The inspection unit CC may receive the image of the mask MK obtained by the camera CM. The inspection unit CC may be connected to the camera CM through a communication cable. However, the embodiment is not limited to this connection structure between the inspection unit CC and the camera CM. For example, the inspection unit CC may receive the image from the camera CM in a wireless communication manner. The inspection unit CC may be a computer including a communication interface, which is used to communicate with the camera CM, and a processor, but the embodiment is not limited to this example.

Figure 2:
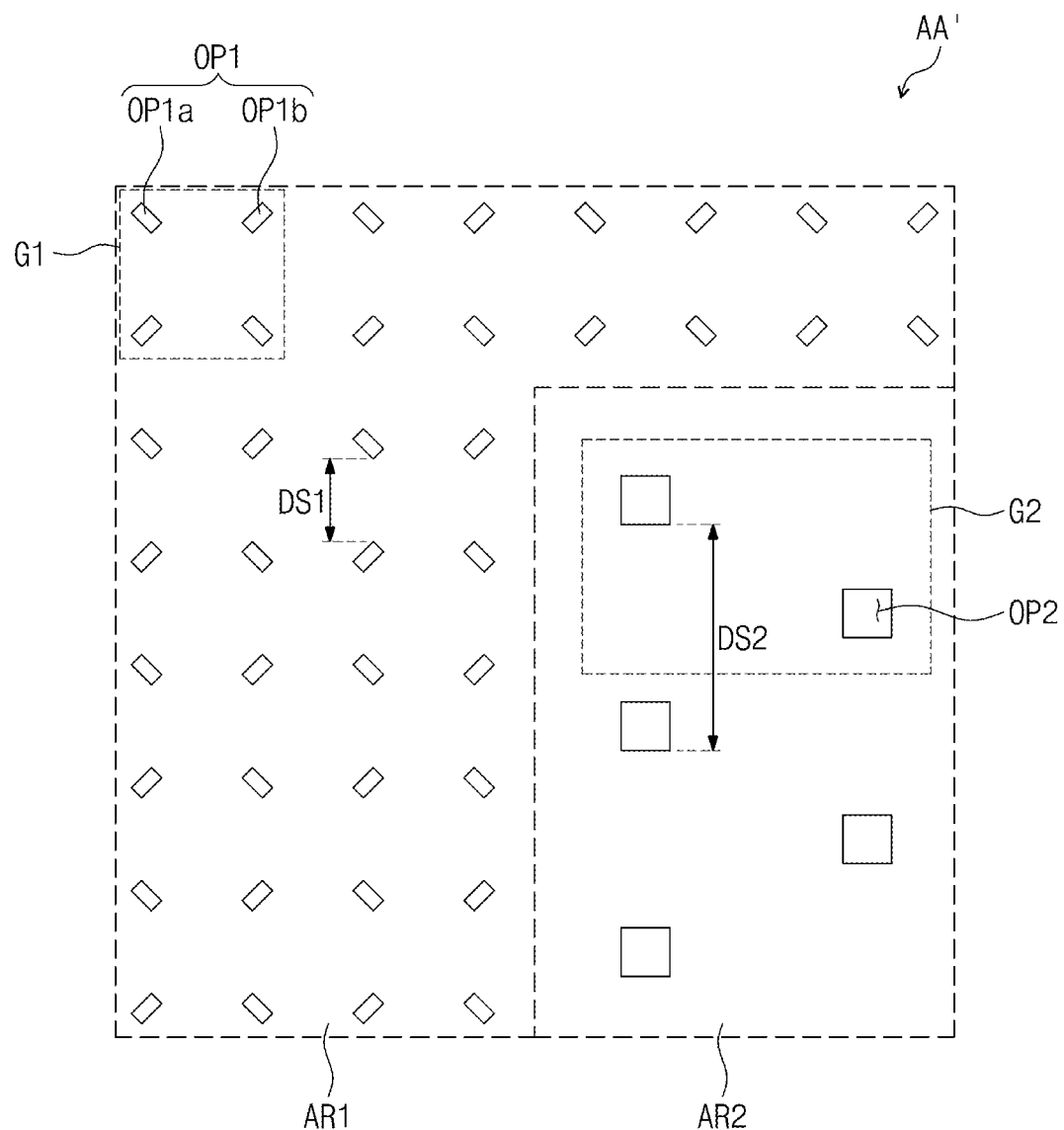
FIG. 2 is an enlarged plan view of a region AA' of FIG. 1.

FIG. 2 is an enlarged plan view of a region AA' of FIG. 1.

Referring to FIG. 2, a plurality of first openings OP1 and a plurality of second openings OP2 may be referred to as open slits. A size of each of the first openings OP1 may be smaller than a size of each of the second openings OP2. A first distance DS1 between adjacent ones of the first openings OP1 may be smaller than a second distance DS2 between adjacent ones of the second openings OP2.

The first and second openings OP1 and OP2 may provide a path allowing a deposition material to pass therethrough. The first and second openings OP1 and OP2 may be provided to expose a deposition target region of a substrate. The first and second openings OP1 and OP2 may expose desired regions of the substrate as the deposition target region.

The first openings OP1 may be arranged in the first and second directions DR1 and DR2. The first openings OP1 may be arranged under a predetermined rule. The first openings OP1 may include a plurality of first opening patterns OP1$a$, which are provided to have a first shape, and a plurality of second opening patterns OP1$b$, which are provided to have a second shape different from the first shape. The first shape and the second shape may be symmetric to each other.

The first and second opening patterns OP1$a$ and OP1$b$ may be alternately arranged in the first direction DR1. The first and second opening patterns OP1$a$ and OP1$b$ may be alternately arranged in the second direction DR2.

A plurality of first groups G1 may be defined in the first region AR1. The first groups G1 may be defined as regions, which are repeatedly arranged under the predetermined rule, and each of which includes the first openings OP1 that are minimally arranged under the predetermined rule. Each of the first groups G1 may include four first openings OP1. For example, each of the first groups G1 may include a pair of the first opening patterns OP1$a$ and a pair of the second opening patterns OP1$b$. However, the embodiment is not limited to this example, and in an embodiment, the number of the first openings OP1 in each of the first groups G1 may be variously changed.

The first groups G1 may be arranged in the first and second directions DR1 and DR2.

The second openings OP2 may be arranged in the first direction DR1, the second direction DR2, and a direction crossing both of the first and second directions DR1 and DR2. The second openings OP2 may be arranged under a predetermined rule.

A plurality of second groups G2 may be defined in the second region AR2. The second groups G2 may be defined as regions, which are repeatedly arranged under the predetermined rule, and each of which includes the second openings OP2 that are minimally arranged under the predetermined rule. Each of the second groups G2 may include a pair of the second openings OP2. However, the embodiment is not limited to this example, and in an embodiment, the number of the second openings OP2 in each of the second groups G2 may be variously changed. For example, the second groups G2 may include at least one second opening OP2.

However, the embodiment is not limited to this shape or size of each of the first and second openings OP1 and OP2, and the shape or size of the first and second openings OP1 and OP2 may be variously changed.

Figure 3:
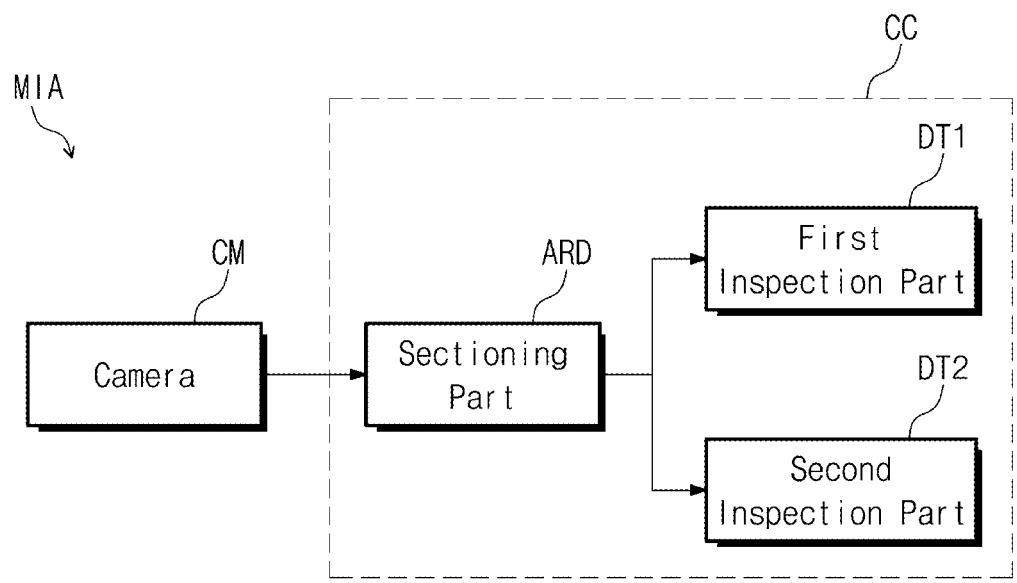
FIG. 3 is a block diagram of an embodiment of a mask inspection apparatus constructed according to the principles of the invention.

FIG. 3 is a block diagram of an embodiment of a mask inspection apparatus constructed according to the principles of the invention.

Referring to FIG. 3, the inspection unit CC may include a sectioning part ARD, a first inspection part DT1, and a second inspection part DT2. For example, the inspection unit CC may be implemented as a processor with any number of hardware and/or software configurations that perform particular functions such as a sectioning function by the sectioning part ARD, a first inspecting function by the first inspection part DT1, and a second inspecting function by the second inspection part DT2. The processor may refer to a data processing device embedded in hard re, having physically structured circuitry to perform the functions represented by code or instructions contained within the program.

The sectioning part ARD may receive an image data obtained by the camera CM. The sectioning part ARD may be used to section the image of the mask MK (e.g., see FIG. 1), which is obtained by the camera CM, into a plurality of partial images. The sectioning part ARD may provide the sectioned image data to the first and second inspection parts DT1 and DT2.

The first inspection part DT1 may inspect the presence or absence of defects in the first region AR1 of the mask MK (e.g., see FIG. 1), based on a partial image of the image sectioned by the sectioning part ARD.

The second inspection part DT2 may inspect the presence or absence of defects in the second region AR2 of the mask MK (e.g., see FIG. 1), based on other partial image of the image sectioned by the sectioning part ARD.

FIG. 3 illustrates an example, in which the first inspection part DT1 is provided as an element different from the second inspection part DT2, but in an embodiment, the first and second inspection parts DT1 and DT2 may be provided as a single element. In this case, the first and second inspection parts DT1 and DT2 may sequentially inspect the two different partial images of the image to inspect the presence or absence of defects in the mask MK (e.g., see FIG. 1). However, an image inspection sequence according to an embodiment is not limited to this example. For example, the first and second inspection parts DT1 and DT2 may simultaneously inspect the two different partial images of the image to inspect the presence or absence of defects in the mask MK (e.g., see FIG. 1).

According to an embodiment, a plurality of openings, which are different from each other, may be defined in the mask MK (e.g., see FIG. 1). Here, the expression of "the openings are different from each other" may mean that there is a difference in shape, size, or arrangement of the openings. The sectioning part ARD may section the image, which is obtained by the camera CM, into a plurality of regions AR1 and AR2, based on the different openings. The first inspection part DT1 may inspect the presence or absence of defects in the first region AR1, based on one of the sectioned partial images, and the second inspection part DT2 may inspect the presence or absence of defects in the second region AR2, based on another of the sectioned partial images. Thus, it may be possible to provide the mask inspection apparatus MIA capable of inspecting the mask MK (e.g., see FIG. 1), in which a plurality of different openings are defined, and a mask inspection method using the same.

Figure 4:
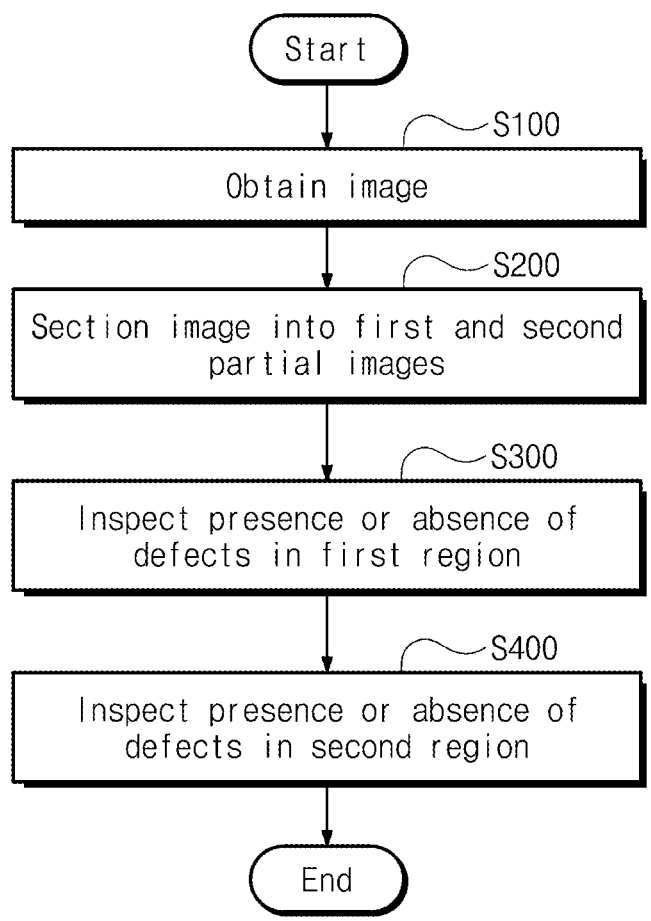
FIG. 4 is a flow chart illustrating a mask inspection method according to the principles of the invention.
Figure 5:
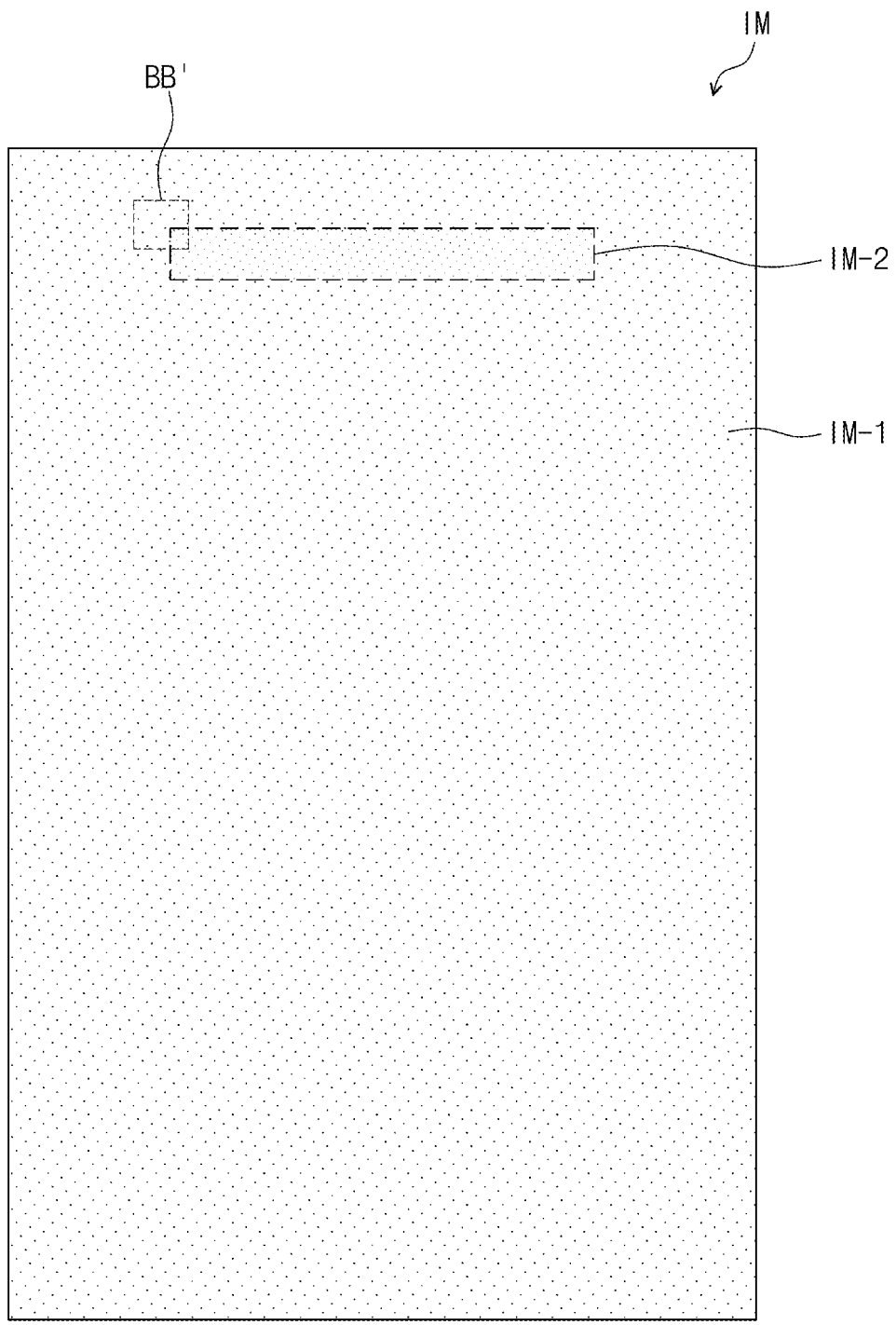
FIG. 5 is a plan view of an embodiment of an image captured by the mask inspection apparatus of FIG. 3.

FIG. 4 is a flow chart illustrating a mask inspection method according to the principles of the invention, and FIG. 5 is a plan view of an embodiment of an image captured by the mask inspection apparatus of FIG. 3.

Referring to FIGS. 4 and 5, the camera CM may obtain an image IM of the mask MK (e.g., see FIG. 1) (S100).

A first partial image IM-1 and a second partial image IM-2, which correspond to the first and second regions AR1 and AR2, respectively, of the mask MK (e.g., see FIG. 1), may be defined in the image IM.

The sectioning part ARD may section the image IM into the first and second partial images IM-1 and IM-2 (S200). The sectioning part ARD may set a boundary between the first and second partial images IM-1 and IM-2.

The first inspection part DT1 may inspect the presence or absence of defects in the first region AR1 of the mask MK (e.g., see FIG. 1), based on the first partial image IM-1 (S300). The first inspection part DT1 may compare patterns, which correspond to the first openings OP1 (e.g., see FIG. 2) included in the first partial image IM-1, from each other.

The second inspection part DT2 may inspect the presence or absence of defects in the second region AR2 of the mask MK (e.g., see FIG. 1), based on the second partial image IM-2 (S400). The second inspection part DT2 may compare patterns, which correspond to the second openings OP2 (e.g., see FIG. 2) included in the second partial image IM-2, from each other.

FIG. 4 illustrates an example, in which the defect inspection step (S300) on the first region AR1 (e.g., see FIG. 1) and the defect inspection step (S400) on the second region AR2 (e.g., see FIG. 1) are sequentially performed, but the mask inspection method is not limited to this order. In an embodiment, the mask inspection method may be performed to sequentially perform the defect inspection step (S400) on the second region AR2 (e.g., see FIG. 1) and the defect inspection step (in S300) on the first region AR1 (e.g., see FIG. 1) or to simultaneously perform the defect inspection steps (S300 and S400) on the first and second regions AR1 and AR2 (e.g., see FIG. 1).

Figure 6:
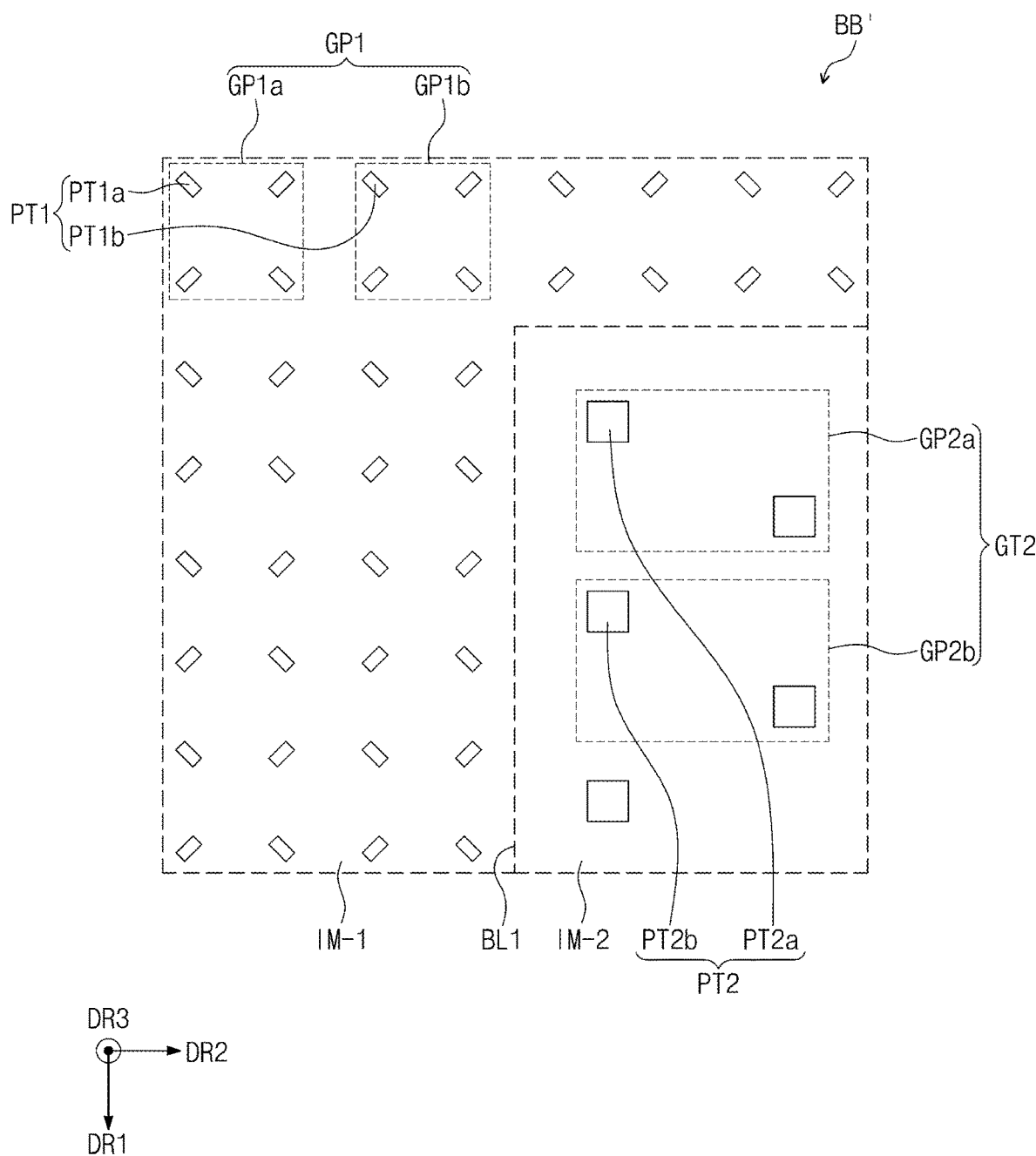
FIG. 6 is an enlarged plan view of an embodiment of a region BB' of FIG. 5.

FIG. 6 is an enlarged plan view of an embodiment of a region BB' of FIG. 5.

Referring to FIGS. 2, 3, and 6, the region BB' of FIG. 5 may be an image of the region AA' of FIG. 2 obtained by the camera CM. The first partial image IM-1 may include a plurality of first patterns PT1 corresponding to the first openings OP1 of the first region AR1. The second partial image IM-2 may include a plurality of second patterns PT2 corresponding to the second openings OP2 of the second region AR2.

The first patterns PT1 may be arranged in the first and second directions DR1 and DR2. The first patterns PT1 may be arranged under a predetermined rule.

A plurality of first groups GP1 may be defined in the first partial image IM-1. The first groups GP1 may be defined as groups, which are repeatedly arranged under the predetermined rule, and each of which includes the first patterns PT1 that are minimally arranged under the predetermined rule. The first groups GP1 may correspond to the first groups G1 of the first region AR1.

Each of the first groups GP1 may include n first group patterns, which are some of the first patterns PT1. The number n may be an integer of 2 or greater. For example, the number n may be 4. However, the embodiment is not limited to this example, and the number of the first group patterns PT1 in each of the first groups GP1 may be variously changed.

The first groups GP1 may be arranged in the first and second directions DR1 and DR2. The second patterns PT2 may be arranged in the first direction DR1, the second direction DR2, and a direction crossing both of the first and second directions DR1 and DR2. The second patterns PT2 may be arranged under a predetermined rule.

A plurality of second groups GP2 may be defined in the second partial image IM-2. The second groups GP2 may be defined as groups, which are repeatedly arranged under the predetermined rule, and each of which includes the second patterns PT2 that are minimally arranged under the predetermined rule. The second groups GP2 may correspond to the second groups G2 of the second region AR2.

Each of the second groups GP2 may include m second group patterns PT2, which are some of the second patterns PT2. The number m may be an integer of 2 or greater. For example, the number m may be 2. However, the embodiment is not limited to this example, and the number of the second group patterns PT2 in each of the second groups GP2 may be variously changed.

The numbers n and m may be different from each other. For example, the number n may be greater than the number m. A first size of each of the first groups GP1 may be different from a second size of each of the second groups GP2. For example, the first size of each of the first groups GP1 may be smaller than the second size of each of the second groups GP2.

The sectioning part ARD may set a boundary BL1 between the first and second partial images IM-1 and IM-2. The first and second partial images IM-1 and IM-2 may be differentiated from each other by the boundary BL1. The sectioning part ARD may set a region, in which a shape of a pattern in the image IM (e.g., see FIG. 4) is changed from a first shape of each of the first patterns PT1 to a second shape of each of the second patterns PT2, as the boundary BL1.

The first shape may be different from the second shape. For example, the first shape may be a slanted rectangle, and the second shape may be a tetragonal shape.

The sectioning part ARD may set a region, in which a size of a pattern in the image IM (e.g., see FIG. 4) is changed from a first size of each of the first patterns PT1 to a second size of each of the second patterns PT2, as the boundary BL1.

The first size may be different from the second size. For example, the first size may be smaller than the second size.

According to an embodiment, the mask inspection apparatus MIA may include the sectioning part ARD. The sectioning part ARD may set the boundary BL1 between the first and second partial images IM-1 and IM-2 respectively corresponding to the first and second regions AR1 and AR2 of the mask MK (e.g., see FIG. 1). The mask inspection apparatus MIA may be configured to section the mask MK (e.g., see FIG. 1) into the first and second regions AR1 and AR2, based on the boundary BL1, and then to perform an inspection process on each of the first and second regions AR1 and AR2. Thus, it may be possible to provide the mask inspection apparatus MIA capable of inspecting the mask MK (e.g., see FIG. 1), in which a plurality of different openings OP1 and OP2 are defined, and a mask inspection method using the same.

The first inspection part DT1 may compare a target pattern PT1a, which is one of the first patterns PT1, with neighboring patterns PT1b, which are others of the first patterns PT1 and are adjacent to the target pattern PT1a. The target pattern PT1a and the neighboring pattern PT1b, which are adjacent to each other in the second direction DR2, are illustrated in FIG. 6, but the neighboring pattern PT1b may not be limited to this example. For example, the neighboring pattern PT1b may be a pattern that is adjacent to the target pattern PT1a in the first direction DR1.

The first inspection part DT1 may compare the target pattern PT1a with the neighboring patterns PT1b. For example, the target pattern PT1a may be compared with the first pattern PT1b, which is adjacent thereto in the second direction DR2, and another one (not shown) of the first patterns PT1, which is adjacent thereto in the first direction DR1. An example, in which two neighboring patterns are compared with the target pattern PT1a, is exemplarily illustrated, but the embodiment is not limited to this example. For example, the target pattern PT1a may be compared with three or four other neighboring first patterns.

In the case where, as a result of the comparison, a shape of the target pattern PT1a is evaluated to be substantially the same as a shape of each of the neighboring patterns PT1b, the first inspection part DT1 may determine that the first region AR1 of the mask MK (e.g., see FIG. 1) is normal. Here, the expression "substantially the same" may mean that a difference in shape is within a tolerance margin that can be evaluated to be normal. The tolerance margin may be given depending on a desired design value. In the case where, as a result of the comparison, the shape of the target pattern PT1a is evaluated to be different from the shape of each of the neighboring patterns PT1b, the first inspection part DT1 may determine that there is a failure in the first region AR1 of the mask MK (e.g., see FIG. 1).

In the case where, as a result of the comparison, a size of the target pattern PT1a is evaluated to be substantially the same as a size of each of the neighboring patterns PT1b, the first inspection part DT1 may determine that the first region AR1 of the mask MK (e.g., see FIG. 1) is normal. Here, the expression "substantially the same" may mean that a difference in size is within a tolerance margin that can be evaluated to be normal. In the case where, as a result of the comparison, the size of the target pattern PT1a is evaluated to be different from the size of each of the neighboring patterns PT1b, the first inspection part DT1 may determine that that is a failure in the first region AR1 of the mask MK (e.g., see FIG. 1).

The first inspection part DT1 may compare the first groups GP1 with each other. The first groups GP1 may correspond to the first groups G1 of the mask MK (e.g., see FIG. 1). The first inspection part DT1 may compare a target group GP1a, which is one of the first groups GP1, with a neighboring group GP1b, which is another of the first groups GP1 adjacent to the target group GP1a. The target group GP1a and the neighboring group GP1b, which are adjacent to each other in the second direction DR2, are illustrated in FIG. 6, but the neighboring group GP1b may not be limited to this example. For example, the neighboring group GP1b may be a group that is adjacent to the target group GP1a in the first direction DR1.

The first inspection part DT1 may compare the target group GP1a with the neighboring groups GP1b adjacent to the target group GP1a. For example, the target group GP1a may be compared with the neighboring group GP1b adjacent thereto in the second direction DR2 and another one (not shown) of the first groups G1 adjacent thereto in the first direction DR1. An example, in which two neighboring groups are compared with the target group GP1a, is exemplarily illustrated, but the embodiment is not limited to this example. For example, the target group GP1a may be compared with three or four other neighboring groups.

In the case where, as a result of the comparison, a shape of a pattern disposed in the target group GP1a is evaluated to be substantially the same as a shape of a pattern disposed in each of the neighboring groups GP1b, the first inspection part DT1 may determine that the first region AR1 of the mask MK (e.g., see FIG. 1) is normal. In the case where the shape of the pattern disposed in the target group GP1a is evaluated to be different from the shape of the pattern disposed in each of the neighboring groups GP1b, the first inspection part DT1 may determine that there is a failure in the first region AR1 of the mask MK (e.g., see FIG. 1).

The second inspection part DT2 may compare a target pattern PT2a, which is one of the second patterns PT2, with a neighboring pattern PT2b, which is another of the second patterns PT2 adjacent to the target pattern PT2a. The target pattern PT2a and the neighboring pattern PT2b, which are adjacent to each other in the first direction DR1, are illustrated in FIG. 6, but the neighboring pattern PT2b may not be limited to this example. For example, the neighboring pattern PT2b may be a pattern that is adjacent to the target pattern PT2a in the second direction DR2.

The second inspection part DT2 may compare the target pattern PT2a with the neighboring patterns PT2b adjacent to the target pattern PT2a. For example, the target pattern PT2a may be compared with the neighboring pattern PT2b, which is adjacent thereto in the first direction DR1, and another one (not shown) of the second patterns PT2, which is adjacent thereto in the second direction DR2. An example, in which two neighboring patterns are compared with the target pattern PT2a, is exemplarily illustrated, but the embodiment is not limited to this example. For example, the target pattern PT2a may be compared with three or four adjacent neighboring patterns.

In the case where, as a result of the comparison, a shape of the target pattern PT2a is evaluated to be substantially the same as a shape of each of the neighboring patterns PT2b, the second inspection part DT2 may determine that the second region AR2 of the mask MK (e.g., see FIG. 1) is normal. In the case where, as a result of the comparison, the shape of the target pattern PT2a is evaluated to be different from the shape of each of the neighboring patterns PT2b, the second inspection part DT2 may determine that there is a failure in the second region AR2 of the mask MK (e.g., see FIG. 1).

In the case where, as a result of the comparison, a size of the target pattern PT2a is evaluated to be substantially the same as a size of each of the neighboring patterns PT2b, the second inspection part DT2 may determine that the second region AR2 of the mask MK (e.g., see FIG. 1) is normal. In the case where, as a result of the comparison, the size of the target pattern PT2a is evaluated to be different from the size of each of the neighboring patterns PT2b, the second inspection part DT2 may determine that there is a failure in the second region AR2 of the mask MK (e.g., see FIG. 1).

The second inspection part DT2 may compare the second groups GP2 with each other. The second groups GP2 may correspond to the second groups G2 of the mask MK (e.g., see FIG. 1). The second inspection part DT2 may compare a target group GP2a, which is one of the second groups GP2, with a neighboring group GP2b, which is another of the second groups GP2 adjacent to the target group GP2a. The target group GP2a and the neighboring group GP2b which are adjacent to each other in the first direction DR1, are illustrated in FIG. 6, but the neighboring group GP2b may not be limited to this example. For example, the neighboring group GP2b may be a group that is adjacent to the target group GP2b in the second direction DR2.

The second inspection part DT2 may compare the target group GP2a with the neighboring groups GP2b adjacent to the target group GP2a. For example, the target group GP2a may be compared with the neighboring group GP2b, which is adjacent thereto in the first direction DR1, and another one (not shown) of the second group GP2 adjacent thereto in the second direction DR2. An example, in which two neighboring groups are compared with the target group GP2a, is exemplarily illustrated, but the embodiment is not limited to this example. For example, the target group GP2a may be compared with three or four other neighboring groups.

In the case where, as a result of the comparison, a shape of a pattern disposed in the target group GP2a is evaluated to be substantially the same as a shape of a pattern disposed in each of the neighboring groups GP2b, the second inspection part DT2 may determine that the second region AR2 of the mask MK (e.g., see FIG. 1) is normal. In the case where the shape of the pattern in the target group GP2a is evaluated to be different from the shape of the pattern in each of the neighboring groups GP2b, the second inspection part DT2 may determine that there is a failure in the second region AR2 of the mask MK (e.g., see FIG. 1).

In the case where the first inspection part DT1 determines that the first region AR1 is normal and the second inspection part DT2 determines that the second region AR2 is normal, the mask inspection apparatus MIA may determine that the mask MK (e.g., see FIG. 1) is normal.

According to an embodiment, the sectioning part ARD may differentiate the first and second partial images IM-1 and IM-2 from each other, based on the boundary BL1. The first inspection part DT1 may inspect the presence or absence of defects in the first region AR1, based on the first partial image and the second inspection part DT2 may inspect the presence or absence of defects in the second region AR2, based on the second partial image IM-2. Thus, it may be possible to provide the mask inspection apparatus MIA, which is configured to inspect the mask MK (e.g., see FIG. 1), in which a plurality of different openings OP1 and OP2 are defined, in an opening-based sectioning manner, and a mask inspection method using the same. Furthermore, the use of the mask inspection apparatus MIA may make it possible to easily detect a failure in the mask MK (e.g., see FIG. 1) and to improve reliability of the mask MK or the mask inspection test.

Figure 7:
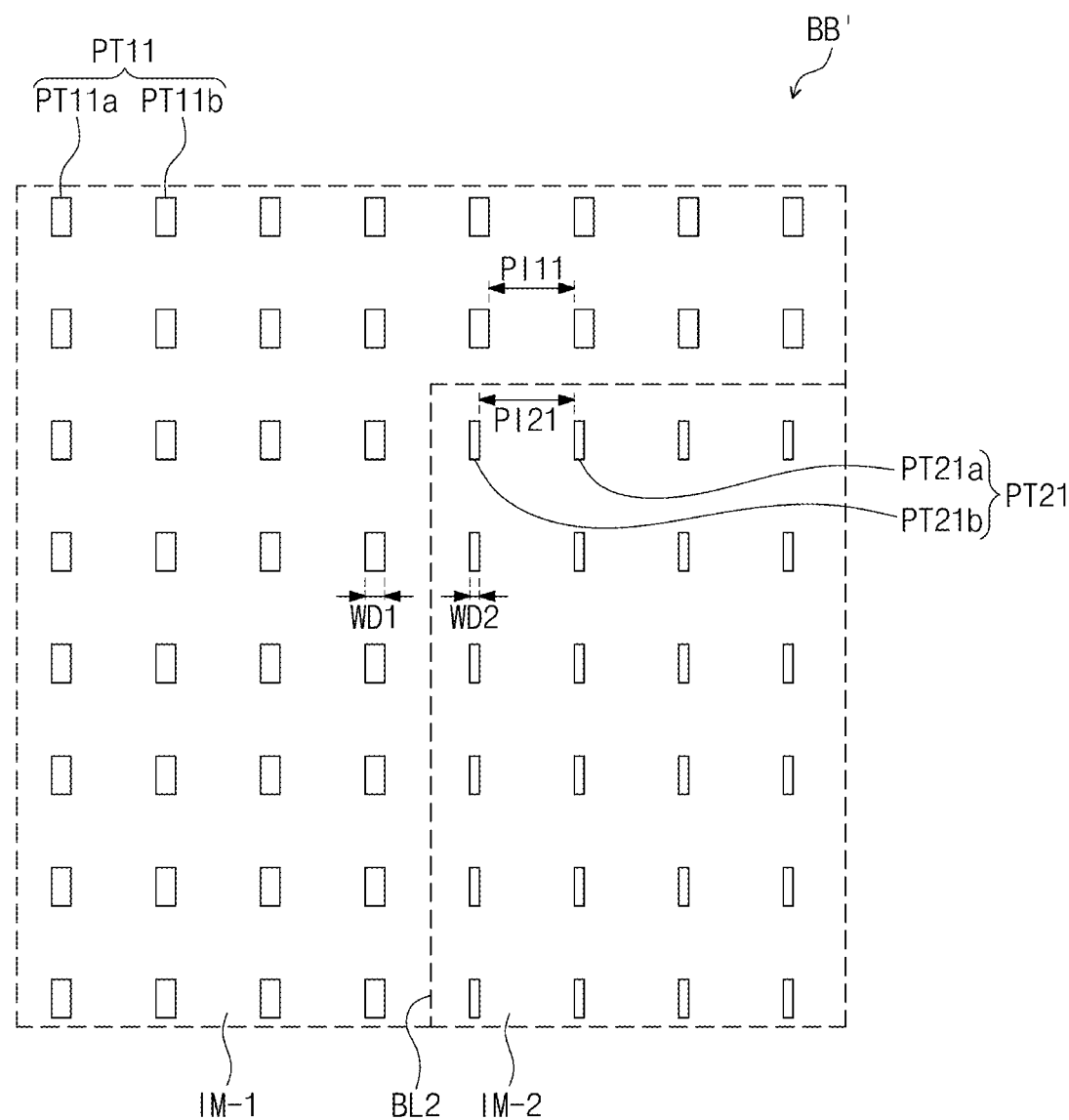
FIGS. 7, 8, and 9 are enlarged plan views of other embodiments of a region corresponding to the region BB' of FIG. 5.
Figure 7:
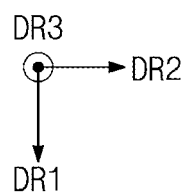

FIG. 7 is an enlarged plan view of another embodiment of a region corresponding to the region BB' of FIG. 5.

Referring to FIGS. 1, 3, and 7, the first partial image may include a plurality of first patterns PT11. A plurality of first openings, which are defined in the first region AR1 of the mask MK, may correspond to the first patterns PT11. The second partial image IM-2 may include a plurality of second patterns PT21. A plurality of second openings, which are defined in the second region AR2 of the mask MK, may correspond to the second patterns PT21.

The first patterns PT11 may be arranged in the first and second directions DR1 and DR2. The second patterns PT21 may be arranged in the first and second directions DR1 and DR2. A ratio of an occupying area of the first patterns PT11 in the first partial image IM-1 may be greater than a ratio of an occupying area of the second patterns PT21 in the second partial image IM-2.

The sectioning part ARD may set a boundary BL2 between the first and second partial images IM-1 and IM-2. The first and second partial images IM-1 and IM-2 may be differentiated from each other by the boundary BL2.

The sectioning part ARD may set a region, in which a size of a pattern in the image IM (e.g., see FIG. 4) is changed from a first size of each of the first patterns PT11 to a second size of each of the second patterns PT21, as the boundary BL2.

The first size may be different from the second size. For example, the first size may be greater than the second size.

A first pitch PI11 between the first patterns PT11 may be equal to a second pitch PI21 between the second patterns PT21.

Each of the first patterns PT11 may have a first width WD1 in the second direction DR2. Each of the second patterns PT21 may have a second width WD2 in the second direction DR2. The first width WD1 may be greater than the second width WD2. For example, the first width WD1 may be two times the second width WD2.

According to an embodiment, the mask inspection apparatus MIA may include the sectioning part ARD. The sectioning part ARD may set the boundary BL2 between the first and second partial images IM-1 and IM-2 respectively corresponding to the first and second regions AR1 and AR2 of the mask MK. The mask inspection apparatus MIA may be configured to section the mask MK into the first and second regions AR1 and AR2, based on the boundary BL2, and then to perform an inspection process on each of the first and second regions AR1 and AR2. Thus, it may be possible to provide the mask inspection apparatus MIA capable of inspecting the mask MK, in which a plurality of different openings are defined, and a mask inspection method using the same.

The first inspection part DT1 may compare a target pattern PT11a, which is one of the first patterns PT11, with a neighboring pattern PT1b, which is another of the first patterns PT11 adjacent to the target pattern PT11a. The target pattern PT11a and the neighboring pattern PT11b, which are adjacent to each other in the second direction DR2, are illustrated in FIG. 7, but the neighboring pattern PT1b may not be limited to this example. For example, the neighboring pattern PT11b may be a pattern that is adjacent to the target pattern PT11a in the first direction DR1.

The first inspection part DT1 may compare the target pattern PT11a with the neighboring patterns PT11b adjacent to the target pattern PT11a. For example, the target pattern PT11a may be compared with the neighboring pattern PT11b, which is adjacent thereto in the second direction DR2, and another one (not shown) of the first patterns PT11, which is adjacent thereto in the first direction DR1. An example, in which two neighboring patterns are compared with the target pattern PT11a, is exemplarily illustrated, but the embodiment is not limited to this example. For example, the target pattern PT11a may be compared with three or four other neighboring patterns.

In the case where, as a result of the comparison, a shape of the target pattern PT11a is evaluated to be substantially the same as a shape of each of the neighboring patterns PT11b, the first inspection part DT1 may determine that the first region AR1 of the mask MK is normal. In the case where the shape of the target pattern PT11a is evaluated to be different from the shape of each of the neighboring patterns PT11b, the first inspection part DT1 may determine that there is a failure in the first region AR1 of the mask MK.

In the case where, as a result of the comparison, a size of the target pattern PT11a is evaluated to be substantially the same as a size of each of the neighboring patterns PT11b, the first inspection part DT1 may determine that the first region AR1 of the mask MK is normal. In the case where the size of the target pattern PT11a is evaluated to be different from the size of each of the neighboring patterns PT11b, the first inspection part DT1 may determine that there is a failure in the first region AR1 of the mask MK.

The second inspection part DT2 may compare a target pattern PT21a, which is one of the second patterns PT21, with a neighboring pattern PT21b, which is another of the second patterns PT21 adjacent to the target pattern PT21a. The target pattern PT21a and the neighboring pattern PT21b, which are adjacent to each other in the second direction DR2, are illustrated in FIG. 7, but the neighboring pattern PT21b may not be limited to this example. For example, the neighboring pattern PT21b may be a pattern that is adjacent to the target pattern PT21a in the first direction DR1.

The second inspection part DT2 may compare the target pattern PT21a with the neighboring patterns PT21b adjacent to the target pattern PT21a. For example, the target pattern PT21a may be compared with the neighboring pattern PT21b, which is adjacent thereto in the second direction DR2, and another one (not shown) of the second patterns PT21, which is adjacent thereto in the first direction DR1. An example, in which two neighboring patterns are compared with the target pattern PT21a, is exemplarily illustrated, but the embodiment is not limited to this example. For example, the target pattern PT21a may be compared with three or four other neighboring patterns.

In the case where, as a result of the comparison, a shape of the target pattern PT21a is evaluated to be substantially the same as a shape of each of the neighboring patterns PT21b, the second inspection part DT2 may determine that the second region AR2 of the mask MK is normal. In the case where the shape of the target pattern PT21a is evaluated to be different from the shape of each of the neighboring patterns PT21b, the second inspection part DT2 may determine that there is a failure in the second region AR2 of the mask MK.

In the case where, as a result of the comparison, a size of the target pattern PT21a is evaluated to be substantially the same as a size of each of the neighboring patterns PT21b, the second inspection part DT2 may determine that the second region AR2 of the mask MK is normal. In the case where the size of the target pattern PT21a is evaluated to be different from the size of each of the neighboring patterns PT21b, the second inspection part DT2 may determine that there is a failure in the second region AR2 of the mask MK.

In the case where the first inspection part DT1 determines that the first region AR1 is normal and the second inspection part DT2 determines that the second region AR2 is normal, the mask inspection apparatus MIA may determine that the mask MK is normal.

According to an embodiment, the sectioning part ARD may differentiate the first and second partial images IM-1 and IM-2 from each other, based on the boundary BL2. The first inspection part DT1 may inspect the presence or absence of defects in the first region AR1, based on the first partial image IM-1, and the second inspection part DT2 may inspect the presence or absence of defects in the second region AR2, based on the second partial image IM-2. Thus, it may be possible to provide the mask inspection apparatus MIA, which is configured to inspect the mask MK, in which a plurality of different openings are defined, in an opening-based sectioning manner, and a mask inspection method using the same. Furthermore, the use of the mask inspection apparatus MIA may make it possible to easily detect a failure in the mask MK and to improve reliability of the mask MK.

Figure 8:
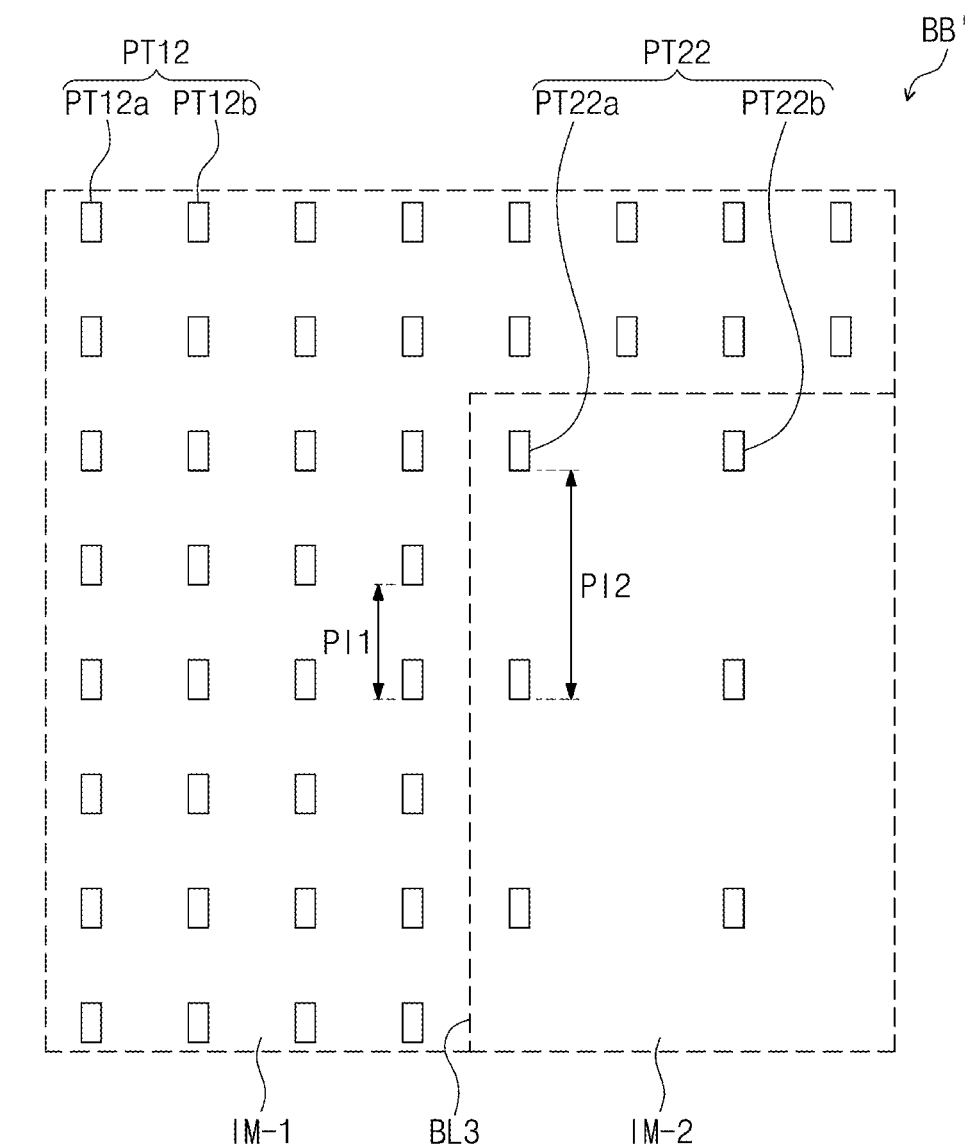

FIG. 8 is an enlarged plan view of still another embodiment of a region corresponding to the region BB' of FIG. 5.

Referring to FIGS. 1, 3, and 8, the first partial image IM-1 may include a plurality of first patterns PT12. The first openings defined in the first region AR1 of the mask MK may correspond to the first patterns PT12. The second partial image IM-2 may include a plurality of second patterns PT22. The second openings defined in the second region AR2 of the mask MK may correspond to the second patterns PT22.

The first patterns PT12 may be arranged in the first and second directions DR1 and DR2. The second patterns PT22 may be arranged in the first and second directions DR1 and DR2. A ratio of an occupying area of the first patterns PT12 in the first partial image IM-1 may be greater than a ratio of an occupying area of the second patterns PT22 in the second partial image IM-2.

The sectioning part ARD may set a boundary BL3 between the first and second partial images IM-1 and IM-2. The first and second partial images IM-1 and IM-2 may be differentiated from each other by the boundary BL3.

The sectioning part ARD may set a region, in which a pitch between patterns in the image IM (e.g., see FIG. 4) is changed from a first pitch PI1 between the first patterns PT12 to a second pitch PI2 between the second patterns PT22, as the boundary BL3.

The first pitch PI1 may be different from the second pitch PI2. The first pitch PI1 may be smaller than the second pitch PI2. For example, the second pitch PI2 may be two times the first pitch PI1.

A first shape of each of the first patterns PT12 may be the same as a second shape of each of the second patterns PT22. A first size of each of the first patterns PT12 may be the same as a second size of each of the second patterns PT22.

According to an embodiment, the mask inspection apparatus MIA may include the sectioning part ARD. The sectioning part ARD may set the boundary BL3 between the first and second partial images IM-1 and IM-2 respectively corresponding to the first and second regions AR1 and AR2 of the mask MK. The mask inspection apparatus MIA may be configured to section the mask MK into the first and second regions AR1 and AR2, based on the boundary BL3, and then to perform an inspection process on the first and second regions AR1 and AR2. Thus, it may be possible to provide the mask inspection apparatus MIA capable of inspecting the mask MK, in which a plurality of different openings are defined, and a mask inspection method using the same.

The first inspection part DT1 may compare a target pattern PT12a, which is one of the first patterns PT12, with a neighboring pattern PT12b, which is another of the first patterns PT12 adjacent to the target pattern PT12a. The target pattern PT12a and the neighboring pattern PT12b, which are adjacent to each other in the second direction DR2, are illustrated in FIG. 8, but the neighboring pattern PT12b may not be limited to this example. For example, the neighboring pattern PT12b may be a pattern that is adjacent to the target pattern PT12a in the first direction DR1.

The first inspection part DT1 may compare the target pattern PT12a with the neighboring patterns PT12b adjacent to the target pattern PT12a. For example, the target pattern PT12a may be compared with the neighboring pattern PT12b, which is adjacent thereto in the second direction DR2, and another one (not shown) of the first patterns PT12, which is adjacent thereto in the first direction DR1. An example, in which two neighboring patterns are compared with the target pattern PT12a, is exemplarily illustrated, but the embodiment is not limited to this example. For example, the target pattern PT12a may be compared with three or four other neighboring patterns.

In the case where, as a result of the comparison, a shape of the target pattern PT12a is evaluated to be substantially the same as a shape of each of the neighboring patterns PT12b, the first inspection part DT1 may determine that the first region AR1 of the mask MK is normal. In the case where the shape of the target pattern PT12a is evaluated to be different from the shape of each of the neighboring patterns PT12b, the first inspection part DT1 may determine that there is a failure in the first region AR1 of the mask MK.

In the case where, as a result of the comparison, a size of the target pattern PT12a is evaluated to be substantially the same as a size of each of the neighboring patterns PT12b, the first inspection part DT1 may determine that the first region AR1 of the mask MK is normal. In the case where the size of the target pattern PT12a is evaluated to be different from the size of each of the neighboring patterns PT12b, the first inspection part DT1 may determine that there is a failure in the first region AR1 of the mask MK.

The second inspection part DT2 may compare a target pattern PT22a, which is one of the second patterns PT22, with a neighboring pattern PT22b, which is another of the second patterns PT22 adjacent to the target pattern PT22a. The target pattern PT22a and the neighboring pattern PT22b, which are adjacent to each other in the second direction DR2, are illustrated in FIG. 8, but the neighboring pattern PT22b may not be limited to this example. For example, the neighboring pattern PT22b may be a pattern that is adjacent to the target pattern PT22a in the first direction DR1.

The second inspection part DT2 may compare the target pattern PT22a with the neighboring patterns PT22b adjacent to the target pattern PT22a. For example, the target pattern PT22a may be compared with the neighboring pattern PT22b, which is adjacent thereto in the second direction DR2, and another one (not shown) of the second patterns PT22, which is adjacent thereto in the first direction DR1. An example, in which two neighboring patterns are compared with the target pattern PT22a, is exemplarily illustrated, but the embodiment is not limited to this example. For example, the target pattern PT22a may be compared with three or four other neighboring patterns.

In the case where, as a result of the comparison, a shape of the target pattern PT22a is evaluated to be substantially the same as a shape of each of the neighboring patterns PT22b, the second inspection part DT2 may determine that the second region AR2 of the mask MK is normal. In the case where the shape of the target pattern PT22a is evaluated to be different from the shape of each of the neighboring patterns PT22b, the second inspection part DT2 may determine that there is a failure in the second region AR2 of the mask MK.

In the case where, as a result of the comparison, a size of the target pattern PT22a is evaluated to be substantially the same as a size of each of the neighboring patterns PT22b, the second inspection part DT2 may determine that the second region AR2 of the mask MK is normal. In the case where the size of the target pattern PT22a is evaluated to be different from the size of each of the neighboring patterns PT22b, the second inspection part DT2 may determine that there is a failure in the second region AR2 of the mask MK.

In the case where the first inspection part DT1 determines that the first region AR1 is normal and the second inspection part DT2 determines that the second region AR2 is normal, the mask inspection apparatus MIA may determine that the mask MK is normal.

According to an embodiment, the sectioning part ARD may differentiate the first and second partial images IM-1 and IM-2 from each other, based on the boundary BL3. The first inspection part DT1 may inspect the presence or absence of defects in the first region AR1, based on the first partial image and the second inspection part DT2 may inspect the presence or absence of defects in the second region AR2, based on based on the second partial image IM-2. Thus, it may be possible to provide the mask inspection apparatus MIA, which is configured to inspect the mask MK, in which a plurality of different openings are defined, in an opening-based sectioning manner, and a mask inspection method using the same. Furthermore, the use of the mask inspection apparatus MIA may make it possible to easily detect a failure in the mask MK and to improve reliability of the mask MK.

Figure 9:
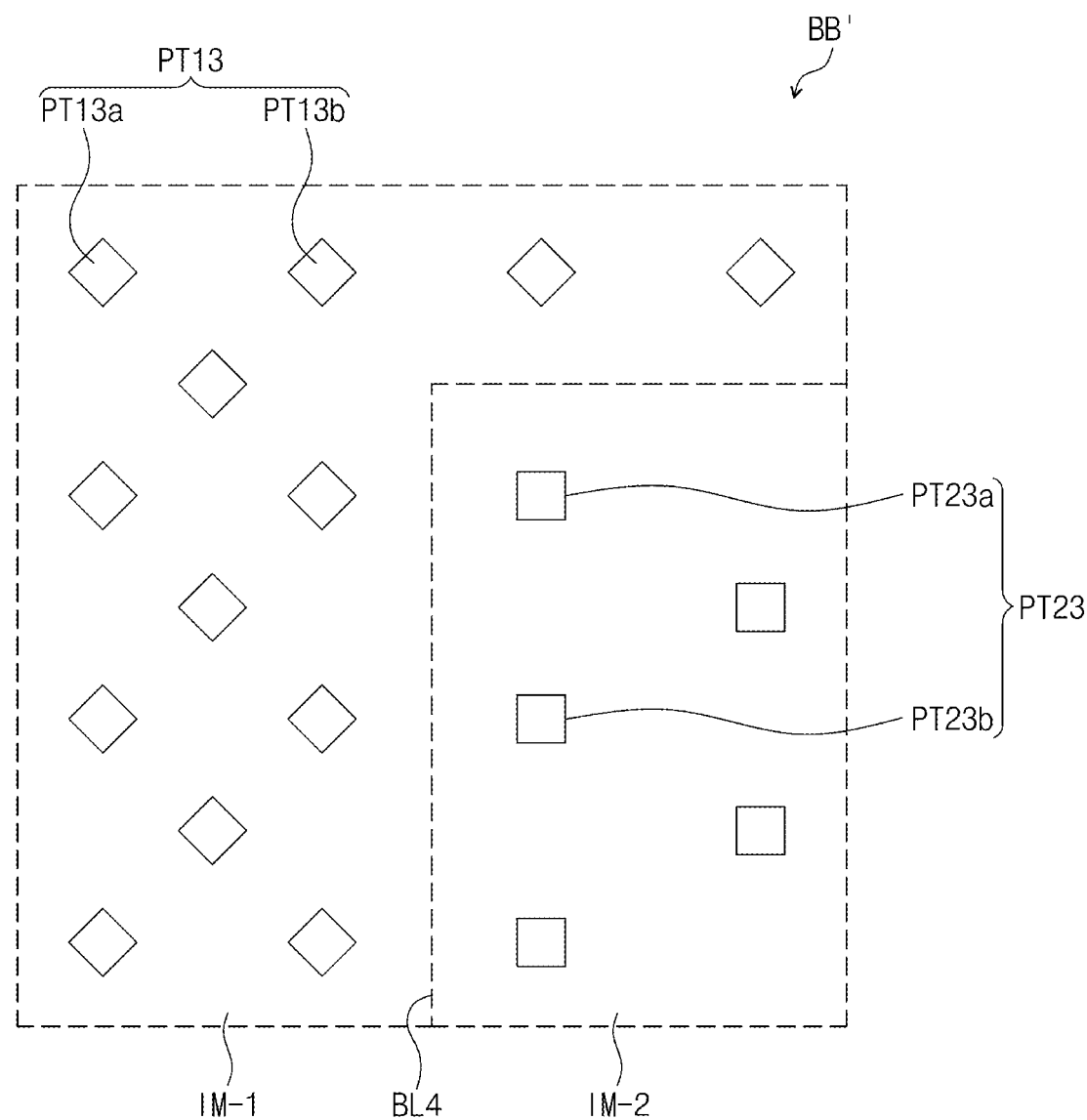

FIG. 9 is an enlarged plan view of still yet another embodiment of a region corresponding to the region BB' of FIG. 5.

Referring to FIGS. 1, 3, and 9, the first partial image may include a plurality of first patterns PT13. A plurality of first openings, which are defined in the first region AR1 of the mask MK, may correspond to the first patterns PT13. The second partial image IM-2 may include a plurality of second patterns PT23. A plurality of second openings, which are defined in the second region AR2 of the mask MK, may correspond to the second patterns PT23.

The first patterns PT13 may be arranged in the first direction DR1, the second direction DR2, and a direction crossing both of the first and second directions DR1 and DR2. The second patterns PT23 may be arranged in the first direction DR1, the second direction DR2, and a direction crossing both of the first and second directions DR1 and DR2. A ratio of an occupying area of the first patterns PT13 in the first partial image IM-1 may be greater than a ratio of an occupying area of the second patterns PT23 in the second partial image IM-2.

The sectioning part ARD may set a boundary BL4 between the first and second partial images IM-1 and IM-2. The first and second partial images IM-1 and IM-2 may be differentiated from each other by the boundary BL4.

The sectioning part ARD may set a region, in which a shape of a pattern in the image IM (e.g., see FIG. 4) is changed from a first shape of each of the first patterns PT13 to a second shape of each of the second patterns PT23, as the boundary BL4.

The first shape may be different from the second shape. For example, the first shape may be a rhombus, and the second shape may be a square.

According to an embodiment, the mask inspection apparatus MIA may include the sectioning part ARD. The sectioning part ARD may set the boundary BL2 between the first and second partial images IM-1 and IM-2 respectively corresponding to the first and second regions AR1 and AR2 of the mask MK. The mask inspection apparatus MIA may be configured to section the mask MK into the first and second regions AR1 and AR2, based on the boundary BL2, and then to perform an inspection process on the first and second regions AR1 and AR2. Thus, the mask inspection apparatus MIA may be configured to enable to inspect the mask MK, in which the different openings are defined, and the mask inspection apparatus MIA may be used for a mask inspection method.

The first inspection part DT1 may compare a target pattern PT13a, which is one of the first patterns PT13, with a neighboring pattern PT13b, which is another of the first patterns PT13 adjacent to the target pattern PT13a. The target pattern PT13a and the neighboring pattern PT13b, which are adjacent to each other in the second direction DR2, are illustrated in FIG. 9, but the neighboring pattern PT13b may not be limited to this example. For example, the neighboring pattern PT13b may be a pattern, which is adjacent to the target pattern PT13a in the first direction DR1 or in a diagonal direction between the first and second directions DR1 and DR2.

The first inspection part DT1 may compare the target pattern PT13a with the neighboring patterns PT13b adjacent to the target pattern PT13a. For example, the target pattern PT13a may be compared with the neighboring pattern PT13b, which is adjacent thereto in the second direction DR2, and another one (not shown) of the first patterns PT13, which is adjacent thereto in the first direction DR1. An example, in which two neighboring patterns are compared with the target pattern PT13a, is exemplarily illustrated, but the embodiment is not limited to this example. For example, the target pattern PT13a may be compared with three or four other neighboring patterns.

In the case where, as a result of the comparison, a shape of the target pattern PT13a is evaluated to be substantially the same as a shape of each of the neighboring patterns PT13b, the first inspection part DT1 may determine that the first region AR1 of the mask MK is normal. In the case where the shape of the target pattern PT13a is evaluated to be different from the shape of each of the neighboring patterns PT13b, the first inspection part DT1 may determine that there is a failure in the first region AR1 of the mask MK.

In the case where, as a result of the comparison, a size of the target pattern PT13a is evaluated to be substantially the same as a size of each of the neighboring patterns PT13b, the first inspection part DT1 may determine that the first region AR1 of the mask MK is normal. In the case where the size of the target pattern PT13a is evaluated to be different from the size of each of the neighboring patterns PT13b, the first inspection part DT1 may determine that there is a failure in the first region AR1 of the mask MK.

The second inspection part DT2 may compare a target pattern PT23a, which is one of the second patterns PT23, with a neighboring pattern PT23b, which is another of the second patterns PT23 adjacent to the target pattern PT23a. The target pattern PT23a and the neighboring pattern PT23b, which are adjacent to each other in the first direction DR1, are illustrated in FIG. 9, but the neighboring pattern PT23b may not be limited to this example. For example, the neighboring pattern PT23b may be a pattern, which is adjacent to the target pattern PT23a in the second direction DR2 or in a diagonal direction between the first and second directions DR1 and DR2.

The second inspection part DT2 may compare the target pattern PT23a with the neighboring patterns PT23b adjacent to the target pattern PT23a. For example, the target pattern PT23a may be compared with the neighboring pattern PT23b, which is adjacent thereto in the first direction DR1, and another one (not shown) of the second patterns PT23 adjacent to each other in the second direction DR2. An example, in which two neighboring patterns are compared with the target pattern PT23a, is exemplarily illustrated, but the embodiment is not limited to this example. For example, the target pattern PT23a may be compared with three or four other neighboring patterns.

In the case where, as a result of the comparison, a shape of the target pattern PT23a is evaluated to be substantially the same as a shape of each of the neighboring patterns PT23b, the second inspection part DT2 may determine that the second region AR2 of the mask MK is normal. In the case where the shape of the target pattern PT23a is evaluated to be different from the shape of each of the neighboring patterns PT23b, the second inspection part DT2 may determine that there is a failure in the second region AR2 of the mask MK.

In the case where, as a result of the comparison, a size of the target pattern PT23a is evaluated to be substantially the same as a size of each of the neighboring patterns PT23b, the second inspection part DT2 may determine that the second region AR2 of the mask MK is normal. In the case where the size of the target pattern PT23a is evaluated to be different from the size of each of the neighboring patterns PT23b, the second inspection part DT2 may determine that there is a failure in the second region AR2 of the mask MK.

In the case where the first inspection part DT1 determines that the first region AR1 is normal and the second inspection part DT2 determines that the second region AR2 is normal, the mask inspection apparatus MIA may determine that the mask MK is normal.

According to an embodiment, the sectioning part ARD may differentiate the first and second partial images IM-1 and IM-2 from each other, based on the boundary BL4. The first inspection part DT1 may inspect the presence or absence of defects in the first region AR1, based on the first partial image and the second inspection part DT2 may inspect the presence or absence of defects in the second region AR2, based on the second partial image IM-2. Thus, it may be possible to provide the mask inspection apparatus MIA, which is configured to inspect the mask MK, in which a plurality of different openings are defined, in an opening-based sectioning manner, and a mask inspection method using the same. Furthermore, the use of the mask inspection apparatus MIA may make it possible to easily detect a failure in the mask MK and to improve reliability of the mask MK.

Figure 10:
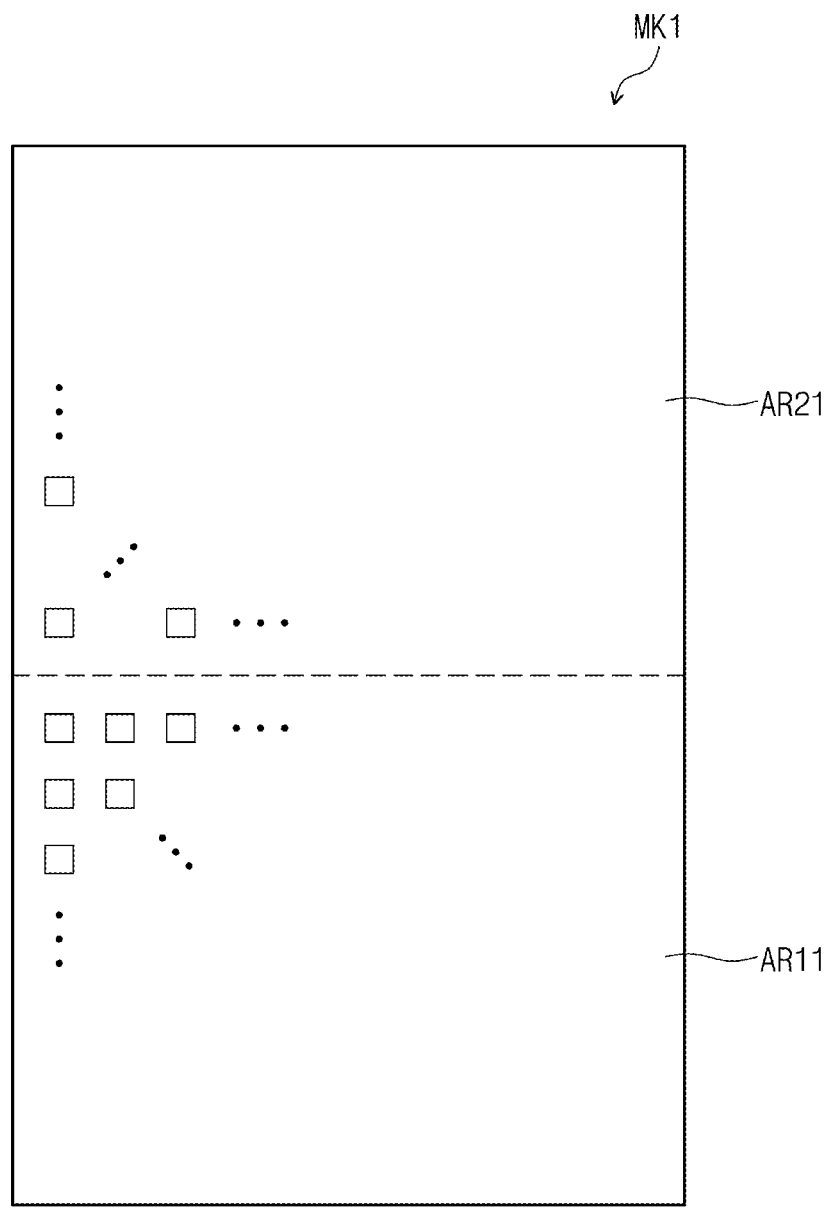
FIGS. 10 and 11 are plan views of embodiments of the mask of FIG. 1.

FIG. 10 is a plan view of an embodiment of the mask of FIG. 1.

Referring to FIGS. 3 and 10, a mask MK1 may include a first region AR11 and a second region AR21, which is adjacent to the first region AR11 in the first direction DR1. However, the embodiment is not limited to this example, and the arrangement of the first and second regions AR11 and AR21 may be variously changed.

A plurality of first openings OP11 may be defined in the first region AR11. A plurality of second openings OP21 may be defined in the second region AR21. The first openings OP11 may be arranged in the first and second directions DR1 and DR2. The second openings OP21 may be arranged in the first and second directions DR1 and DR2.

A distance between adjacent ones of the first openings OP11 may be smaller than a distance between adjacent ones of the second openings OP21. The number of the first openings OP11 disposed in the same area may be greater than the number of the second openings OP21. A ratio of an occupying area of the first openings OP11 in the first region AR11 may be greater than a ratio of an occupying area of the second openings OP21 in the second region AR21.

According to an embodiment, the camera CM may be configured to obtain an image of the entire region of the mask MK1. The sectioning part ARD may section the entire image of the mask MK1 into first and second partial images, in which images of the first and second regions AR11 and AR21 are respectively included. For example, the sectioning part ARD may determine a region, in which a distance between patterns varies, as a boundary between the first and second partial images.

The mask inspection apparatus MIA may be configured to section the mask MK1 into the first and second regions AR11 and AR21 and then to perform an inspection process on each of the first and second regions AR11 and AR21. Since a failure inspection test is separately performed on each region of the mask, it may be possible to more easily detect a failure in the mask and to improve reliability in the mask inspection test.

Figure 11:
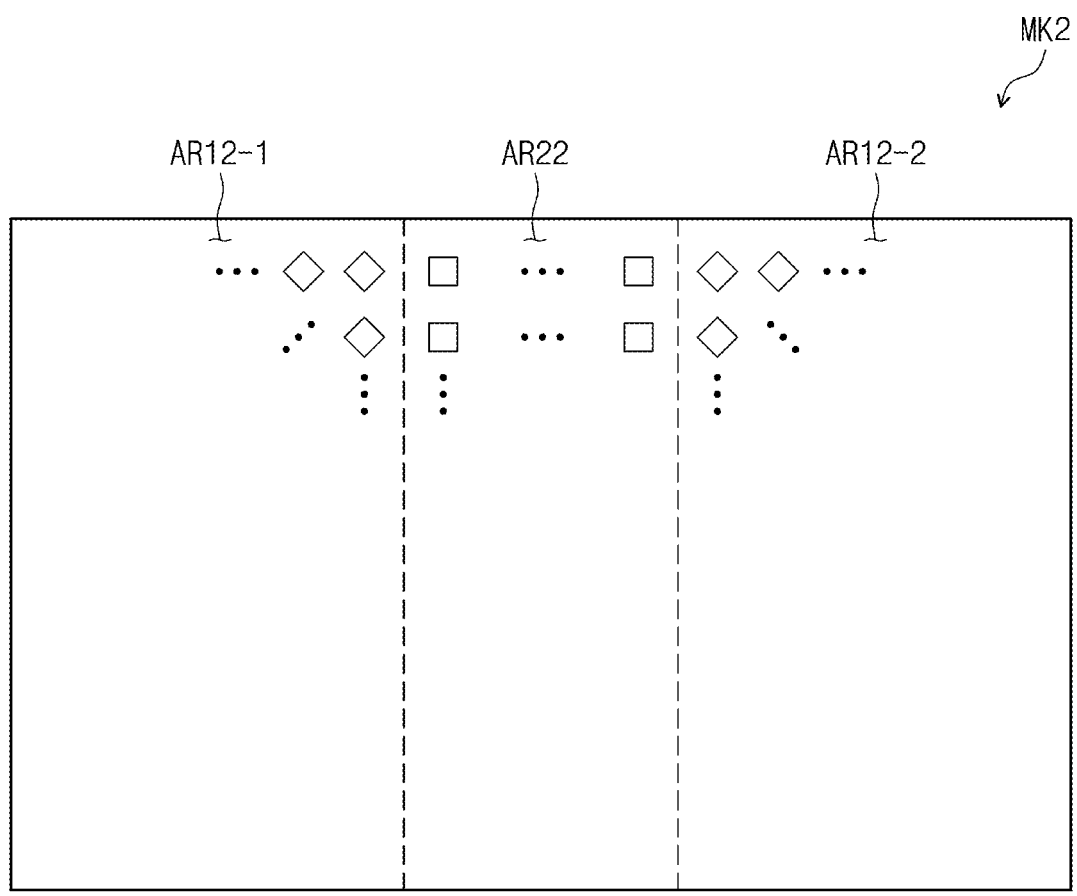

FIG. 11 is a plan view of another embodiment of the mask of FIG. 1.

Referring to FIGS. 3 and 11, the mask inspection apparatus MIA may easily perform a failure inspection process on a mask MK2 including several regions. For example, the mask MK2 may include a first region AR12-1, a second region AR22, and a third region AR12-2. The second region AR22 may be disposed between the first region AR12-1 and the third region AR12-2. A deposition target region to be formed through the second region AR22 may be a folding region of a display device.

A plurality of first openings OP12-1 may be defined in the first region AR12-1. A plurality of second openings OP22 may be defined in the second region AR22. A plurality of third openings OP12-2 may be defined in the third region AR12-2. The first openings OP12-1 and the third openings OP12-2 may be substantially the same. However, the embodiment is not limited to this example of the first and third openings OP12-1 and OP12-2. For example, the first and third openings OP12-1 and OP12-2 may have different shapes or different arrangements.

The first openings OP12-1 may be arranged in the first and second directions DR1 and DR2. The second openings OP22 may be arranged in the first and second directions DR1 and DR2. The third openings OP12-2 may be arranged in the first and second directions DR1 and DR2.

A distance between adjacent ones of the first openings OP12-1 and a distance between adjacent ones of the third openings OP12-2 may be smaller than a distance between adjacent ones of the second openings OP22. The number of the first openings OP12-1 and the number of the third openings OP12-2 disposed in the same area may be greater than the number of the second openings OP22.

Each of a ratio of an occupying area of the first openings OP12-1 in the first region AR12-1 and a ratio of an occupying area of the third openings OP12-2 in the third region AR12-2 may be greater than a ratio of an occupying area of the second openings OP22 in the second region AR22.

According to an embodiment, the camera CM may be used to obtain an image of the entire region of the mask MK2. The sectioning part ARD may section the entire image of the mask MK2 into first, second, and third partial images, in which images of the first, second, and third regions AR12-1, AR22, and AR12-2 are respectively included. For example, the sectioning part ARD may determine a region, in which a distance between patterns or a shape of a pattern is changed, as a boundary between the first and second partial images and a boundary between the second and third partial images.

The mask inspection apparatus MIA may be configured to section the mask MK into the first region AR12-1, the second region AR22, and the third region AR12-2 and then to perform an inspection process on each of the first, second, and third regions AR12-1, AR22, and AR12-2. Since a failure inspection test is separately performed on each region of the mask, it may be possible to more easily detect a failure in the mask and to improve reliability in the mask inspection test.

According to an embodiment, a mask may include a first region, in which a plurality of first openings are defined, and a second region, in which a plurality of second openings are defined, and here, the first openings may differ from the second openings in terms of shape, size, or arrangement. In a mask inspection apparatus and a mask inspection method using the same, it may be possible to separately perform a failure inspection test on the first and second regions of the mask. Since the failure inspection test is separately performed on each region of the mask, it may be possible to more easily detect a failure in the mask and to improve reliability in the mask inspection test.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mask inspection method in a mask inspection apparatus comprising a camera, comprising the steps of:
   obtaining, with the camera, an image of a mask including a first region having a plurality of first openings and a second region having a plurality of second openings;
   sectioning, with a sectioning part receiving the image from the camera, the image into a first partial image corresponding to the first region and a second partial image corresponding to the second region, respectively;
   inspecting, with a first inspection part, the first region of the mask based on the first partial image; and
   inspecting, with a second inspection part, the second region of the mask based on the second partial image.

2. The mask inspection method of claim 1, wherein:
   the step of inspecting the first region comprises the step of comparing a plurality of first patterns in the first partial image with each other, the first patterns corresponding to the first openings; and
   the step of inspecting the second region comprises the step of comparing a plurality of second patterns in the second partial image with each other, the second patterns corresponding to the second openings.

3. The mask inspection method of claim 2, wherein:
   the step of comparing the plurality of first patterns with each other comprises the step of comparing a first target pattern, which is one of the plurality of first patterns, with each of first neighboring patterns, which are others of the plurality of first patterns adjacent to the first target pattern; and
   the step of comparing the plurality of second patterns with each other comprises the step of comparing a second target pattern, which is one of the plurality of second patterns, with each of second neighboring patterns, which are others of the plurality of second patterns adjacent to the second target pattern.

4. The mask inspection method of claim 3, wherein:
the step of comparing the first target pattern with the first neighboring patterns is performed to compare a shape of the first target pattern with a shape of each of the first neighboring patterns and to determine that the first region is normal when the shapes are substantially the same; and
the step of comparing the second target pattern with the second neighboring patterns is configured to perform to compare a shape of the second target pattern with a shape of each of the second neighboring patterns and to determine that the second region is normal when the shapes are substantially the same.

5. The mask inspection method of claim 3, wherein:
the step of comparing the first target pattern with the first neighboring patterns is performed to compare a size of the first target pattern with a size of each of the first neighboring patterns and to determine that the first region is normal when the sizes are substantially the same; and
the step of comparing the second target pattern with the second neighboring patterns is performed to compare a size of the second target pattern with a size of each of the second neighboring patterns and to determine that the second region is normal when the sizes are substantially the same.

6. The mask inspection method of claim 4, wherein the step of sectioning the image into the first and second partial images comprises the step of setting a boundary between the first partial image and the second partial image.

7. The mask inspection method of claim 6, wherein the step of setting the boundary between the first partial image and the second partial image is performed to set a region, in which a pitch between patterns in the image is changed from a first pitch between the plurality of first patterns to a second pitch between the plurality of second patterns, as the boundary, the second pitch being different from the first pitch.

8. The mask inspection method of claim 7, wherein each of the first patterns has a first shape and each of the second patterns has a second shape substantially equal to the first shape.

9. The mask inspection method of claim 7, wherein each of the first patterns has a first size and each of the plurality of first patterns has a second size substantially equal to the first size.

10. The mask inspection method of claim 6, wherein the step of setting the boundary between the first partial image and the second partial image is performed to set a region, in which a shape of a pattern in the image is changed from a first shape of each of the plurality of first patterns to a second shape of each of the plurality of second patterns, as the boundary, the second shape being different from the first shape.

11. The mask inspection method of claim 6, wherein the step of setting the boundary between the first partial image and the second partial image is performed to set a region, in which a size of a pattern in the image is changed from a first size of each of the plurality of first patterns to a second size of each of the plurality of second patterns, as the boundary, the second size being different from the first size.

12. The mask inspection method of claim 2, wherein:
the first partial image comprises a plurality of first groups defined therein, each of the plurality of first groups comprising n first group patterns, which are some of the plurality of first patterns, where the number n is an integer of 2 or greater;
the second partial image comprises a plurality of second groups defined therein, each of the plurality of second groups comprising m second group patterns, which are some of the plurality of second patterns, where the number m is an integer of 2 or greater;
the step of inspecting the first region comprises the step of comparing the plurality of first groups with each other; and
the step of inspecting the second region comprises the step of comparing the plurality of second groups with each other.

13. The mask inspection method of claim 12, wherein the numbers n and m are different from each other.

14. The mask inspection method of claim 12, wherein each of the plurality of first groups has a first size and each of the plurality of second groups has a second size different from the first size.

15. The mask inspection method of claim 12, wherein:
the step of comparing the plurality of first groups with each other comprises the step of comparing a first target group, which is one of the plurality of first groups, with each of first neighboring groups, which are some of the plurality of first groups adjacent to the first target group; and
the step of comparing of the plurality of second groups with each other comprises the step of comparing a second target group, which is one of the plurality of second groups, with each of second neighboring groups, which are some of the plurality of second groups adjacent to the second target group.

16. The mask inspection method of claim 1, wherein the step of obtaining the image comprises the step of obtaining an image of the entire region of the mask.

17. A mask inspection apparatus, comprising:
a camera to obtain an image of a mask including a first region having a plurality of first openings and a second region having a plurality of second openings;
a sectioning part to section the image into a first partial image corresponding to the first region and a second partial image corresponding to the second region, respectively;
a first inspection part to inspect the first region of the mask based on the first partial image; and
a second inspection part to inspect the second region of the mask, based on the second partial image.

18. The mask inspection apparatus of claim 17, wherein:
the first inspection part is configured to compare a plurality of first patterns in the first partial image with each other, the first patterns corresponding to the first openings; and
the second inspection part is configured to compare a plurality of second patterns in the second partial image with each other, the second patterns corresponding to the second openings.

19. The mask inspection apparatus of claim 18, wherein the sectioning part is configured to set a region, in which a pitch between patterns in the image is changed from a first pitch between the plurality of first patterns to a second pitch between the plurality of second patterns, as a boundary, the second pitch being different from the first pitch.

20. The mask inspection apparatus of claim 18, wherein the sectioning part is configured to set a region, in which a shape of a pattern in the image is changed from a first shape of each of the plurality of first patterns to a second shape of each of the plurality of second patterns, as a boundary, the second shape being different from the first shape.

\* \* \* \* \*